United States Patent [19]

Neagu

[11] Patent Number: 4,725,185
[45] Date of Patent: Feb. 16, 1988

[54] FAIL SAFE BRAKE FOR RAIL TYPE LIFTS

[75] Inventor: Alexandru Neagu, Downey, Calif.

[73] Assignee: Maxon Industries, Inc., Huntington Park, Calif.

[21] Appl. No.: 862,478

[22] Filed: May 12, 1986

[51] Int. Cl.$^4$ ............................................. B60P 1/00
[52] U.S. Cl. ................................. 414/540; 414/545;
  187/81; 187/87
[58] Field of Search .................. 414/540, 545, 674;
  187/8.47, 8.49, 8.5, 80, 81, 71, 87; 254/47, 89 H

[56] References Cited

U.S. PATENT DOCUMENTS

| 1,124,609 | 1/1915 | Guffey | 187/81 |
| 1,714,297 | 5/1929 | Crispen | 187/87 X |
| 2,513,224 | 6/1950 | Woodward et al. | 187/81 |
| 2,747,690 | 5/1956 | Vandergriff | 187/81 |
| 4,540,329 | 9/1985 | Martin | 414/540 X |
| 4,576,541 | 3/1986 | Dunn et al. | 414/545 |

FOREIGN PATENT DOCUMENTS

| 233211 | 5/1925 | United Kingdom | 187/81 |
| 1429181 | 3/1976 | United Kingdom . | |

OTHER PUBLICATIONS

Technical Bulletin for British Pat. No. 1429181, 8 pp.

Primary Examiner—Dave W. Arola
Attorney, Agent, or Firm—Frederick E. Mueller

[57] ABSTRACT

The load platform of a lift is carried by a runner mounted for vertical reciprocation along a hollow guide column. Within the column the runner and its load are suspended from a short length of a leaf chain that, in turn, is suspended from a powered vertically reciprocable wire rope. The leaf chain extends between a pair of cam pawls pivotally mounted on a brake body carried by the runner, with the pivot axis of the pawls oriented parallel to the pivot axes of the links of the chain. The pawls are biased in a direction to move out of a retracted position into an extended position wherein they engage one side of the column to jam the brake body against an opposite side of the column. The pawls have a contact pin confronting one side of the chain such that when the chain is under tension it bears on the contact pin and so maintains the pawls in retracted position. Upon a partial or total failure of the wire rope inducing a loss of tension in the leaf chain, the short, pivotally connected links of the chain are readily laterally deflectable and offer no significant resistance to movement of the spring biased pawls into the extended braking position.

14 Claims, 6 Drawing Figures

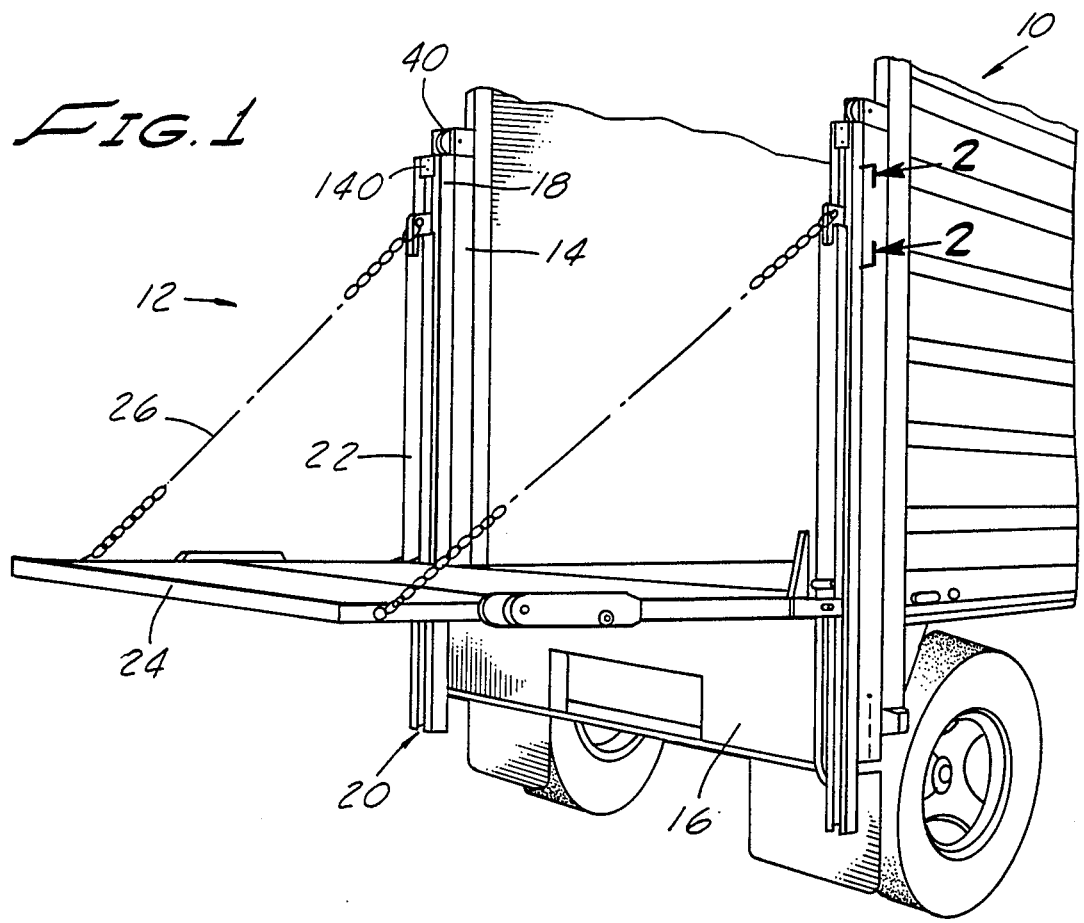
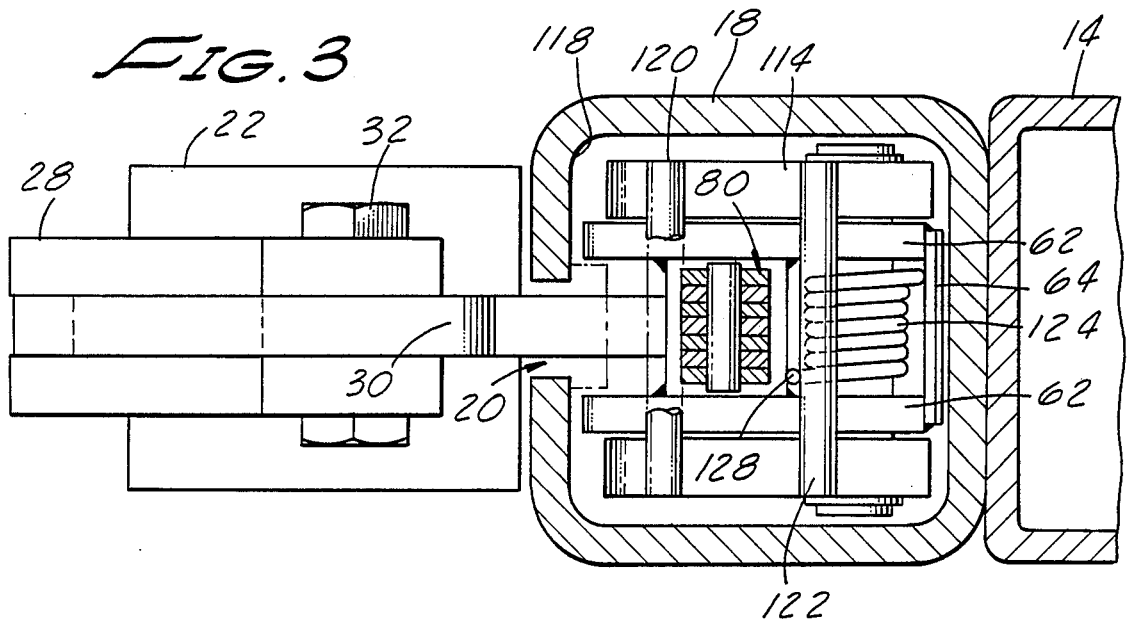

FAIL SAFE BRAKE FOR RAIL TYPE LIFTS

BACKGROUND OF THE INVENTION

The present invention relates to safety devices for load elevators and, more particularly, automatically actuatable fail safe brake mechanisms for platform lifts of the kind having hollow guide rails or columns along which the platform is raised and lowered.

Trucks are often fitted with powered load lifting and lowering appliances, commonly called lift gates, comprising a platform that is movable between ground level and the bed of the vehicle, either at the side or at the tail end of the vehicle bed. In one type, the apparatus includes a laterally spaced apart pair of vertically extending fixed guide columns each of which mounts a vertically elongate runner assembly, the opposite sides of the load platform being connected to the lower ends of the pair of runner assemblies. Typically, the upper end of each runner assembly is interconnected, within the corresponding guide column, to one end of a flexible wire rope, chain or cable that is trained around a sheave at the upper end of the guide column so that the platform is, in effect, suspended from the cable or the like. The other end of the flexible suspension element is usually interconnected to a unidirectionally acting hydraulic cylinder. Typically, the hydraulic system for the cylinder is such that when it is desired to raise the platform from ground level to bed height, a pump is energized to pressurize that side of the cylinder piston which will effect raising of the platform. Conversely, when it is desired to lower the platform from bed height the pump remains de-energized while a valve control is actuated to bleed the cylinder as the force of gravity lowers the platform.

In a lift of this kind, as the platform is suspended by means of a cable or the like, the platform and its load, if any, may drop suddenly if one of the cables supporting the platform breaks. In order to prevent the platform from then falling to the ground, a safety device has previously been devised of the kind shown in United Kingdom patent specification No. 1,429,181. Briefly, in this device at least one of the runners has a pawl mounted on it to which the cable is connected either directly or through an intermediate mechanism such as a spring biased lever. The pawl is normally held out of frictional engagement with its associated guide member by tension in the cable but pivots into frictional engagement with the inside of the guide member when the tension in the cable is released. However, in this device there is an unsatisfactory delay in the response of the pawl to the loss of tension in the supporting cable. Consequently, after a cable breaks the platform and its load, if any, can drop vertically an unacceptable distance along the guide column. Further, as the response time is relatively long the acceleration due to gravity may become quite large and so increase the difficulty of arresting the momentum of the falling platform by means of the interengagement of the pawl with the guide column.

In addition, with the prior device, after the pawl has been actuated into locking engagement with the inside of the guide column, the pawl cannot be unlocked except by raising the platform and the body of the locking device. However, lifts of this kind are fitted with a stop member at or adjacent the upper end of the guide column against which the upper end of the corresponding runner assembly abuts in the fully raised position of the platform. Thus, if the pawl is locked to the column at a time when the platform is in or adjacent to the fully raised position the device cannot be reset except by at least partially dismantling parts of the apparatus. Accordingly, the prior device requires a second auxiliary stop device in the upper part of the column beneath the platform stop which must be specially adjusted relative to the pawl within the column.

Further, taking into account the limited clearance available within a guide column for mounting the parts of the safety device and the range of sizes of cable end fittings to be connected to the safety device, the prior device is not practically adaptable to use with heavy-duty larger capacity lifts.

SUMMARY OF THE INVENTION

The foregoing and other disadvantages of the prior device are solved by the present invention.

The invention comprises a lift with a normally inactive brake assembly that is interposed between the upper end of a runner and the lower end of a wire rope or the like from which the runner assembly and its associated platform is normally suspended. The brake assembly includes a body comprising a spaced pair of plates between which an adaptor link is mounted, at the lower end of the body, for interconnecting the brake assembly to the upper end of the runner assembly. Spaced from the upper end of the body a terminal block is affixed between the plates to anchor the lower end of a length of leaf chain whose upper end is anchored to another terminal block secured to the bottom of a bracket or clevis the upper end of which is connected to an end fitting of the suspension rope or cable. The leaf chain is sufficiently long such that the interconnection between the clevis and wire rope end fitting is clear of the body of the brake assembly. As a result, the only limitation on the cross-sectional girth of the cable end fitting interconnection is the space available within the guide column in which the apparatus is mounted rather than the girth of the brake assembly body.

While a leaf chain is preferred for interconnecting the wire rope and brake assembly, a variety of other forms of flexible element may be employed for this purpose. In any event, the particular form of flexible element employed should be one of high tensile strength which is not subject to appreciable elongation when subjected to tension but, at the same time, is laterally flexible or deflectable in response to any significant relaxation of tension within itself, such as may occur upon a partial or total failure of the wire rope from which the lift apparatus is suspended.

The upper end of the brake body, externally adjacent one side of the plates, pivotally mounts the root ends of a pair of cam pawls on a common shaft. The upper edges of the pair of pawls are rigidly interconnected by a spaced pair of connecting pins between which the length of leaf chain passes. On the opposite side of the leaf chain from the pawl mounting shaft, the cam edges of the pawls are each formed with a spaced series of teeth. The arrangement is such that when the leaf chain is in tension it engages one of the cam pins to maintain the pair of pawls in a retracted condition wherein the cam teeth are held out of engagement with the inside of the guide column. Conversely, upon any significant relaxation of tension in the leaf chain, a torsion spring fitted to the pawl shaft drives the other cam pin to rotate the pawls to drive their teeth into braking engagement with the inside of the guide column.

BRIEF DESCRIPTION OF THE DRAWINGS

FIG. 1 is a schematic perspective view of a rail type vehicle lift gate incorporating the invention;

FIG. 3 is a transverse sectional view taken on the line 3—3 of FIG. 2;

DETAILED DESCRIPTION OF THE PREFERRED EMBODIMENT

Figure 2:
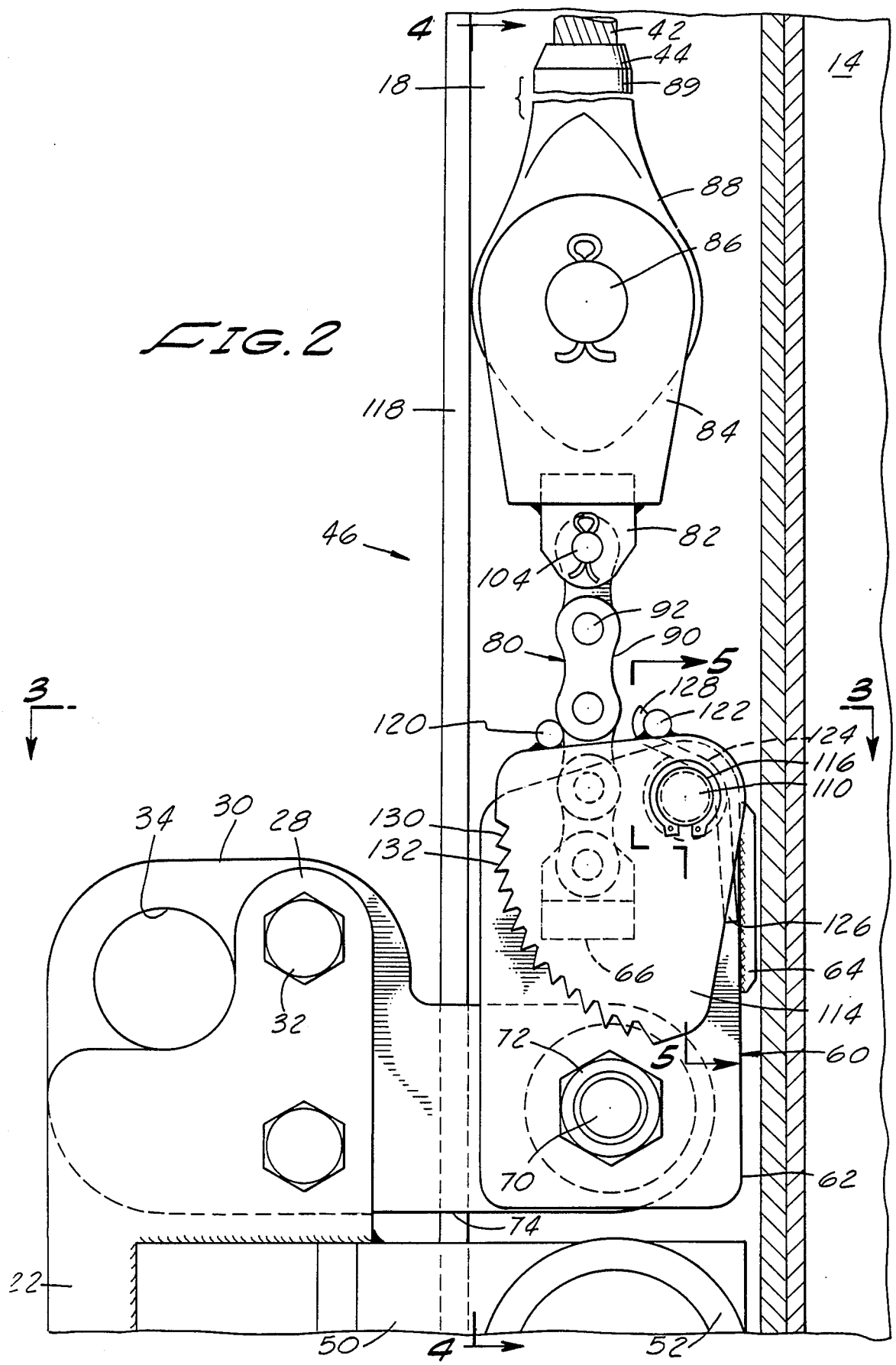
FIG. 2 is a side elevational view of a presently preferred embodiment of the invention, partly in section, showing the brake in an inactive condition.

Before explaining the invention in detail, it should be understood that it is not limited in its application to vehicle lifts nor to the details of construction and the arrangement of the components set forth in the following description or illustrated in the drawings. The invention is capable of application to rail type lifts other than vehicle lift gates and is also capable of being practiced and carried out in various ways. It should further be understood that the phraseology and terminology employed herein is for the purposes of description and should not be regarded as limiting.

Referring to FIG. 1, the tail gate opening of the body of a truck 10 is shown as fitted with a rail type lift gate indicated generally by the numeral 12. The lift gate 12 schematically represents a large platform self-folding platform lift such as is shown in U.S. Pat. No. Re. 31,157 to illustrate application of the invention to heavy duty use, e.g., 6000 pound lifts.

Briefly, the illustrated lift comprises a frame having an opposite pair of vertically upstanding members 14 rigidly interconnected adjacent their lower ends by a crossbox frame member 16. The rear (with respect to the front end of the vehicle) face of each frame member 14 is fitted with a fixed guide column 18 the rear face of which is formed throughout with a vertically extending median slot 20. A vertically elongate runner assembly 22 is vertically movably fitted to the rear face of each guide column 18 with the lower ends of the pair of runner assemblies pivotally supporting a two-piece foldable platform 24. In the case of a heavy duty lift gate, e.g. 6,000 pound capacity, the platform 24, when in the extended horizontal position, is supported at its outer end by means of an elongate flexible member 26, e.g., a chain, that extends from the outer end of the outer platform section to the upper end of the corresponding runner assembly 22. More specifically, as best seen in FIGS. 2 and 3 the upper end of each runner assembly 22 is fitted with an integral pair of spaced apart runner lugs 28 between which the outer end of an adaptor link 30 is received and held in place by a fastening means 32. The outer end of the adaptor link is formed with a hole 34 for interconnection to the upper end of the flexible element or chain 26.

As is schematically indicated in FIG. 1, the upper end of each frame member 14 mounts a pulley or sheave 40 around which a running bight of a wire rope or other flexible member 42 is trained. As is shown in FIG. 2, one end portion of the rope 42 descends into the corresponding guide column 18 to terminate in an end fitting 44. The end fitting 44, in turn, is interconnected to one end of a safety brake assembly 46 whose lower end is interconnected, by means of the adaptor link 30, to the upper end of the platform carrying runner assembly 22.

While the runners could take the form of members telescoped within the guide columns, the external mounting depicted in the drawings is preferred. Thus, referring to FIG. 2, adjacent its upper end each runner assembly, on its forward face and along its longitudinal centerline, is fitted with a rigid arm 50 that passes with clearance through the guide column slot 20 to mount on opposite sides thereof a pair of rollers 52. A similar arm 50 and corresponding rollers 52 are also fitted adjacent the lower end of each runner assembly and the vertically spaced apart pairs of rollers are adapted for rolling engagement with interior wall surfaces of the guide column 18.

The lift apparatus includes a power means (not shown) to effect raising and lowering of the runner assemblies 22 and load platform 24 between ground level and the bed height of the truck. A variety of such power means are well-known in the art. For example, in the case of the lift illustrated in FIG. 1 it is contemplated that each wire rope 42, after ascending within the guide column 18 and passing over the sheave 40, descends within the corresponding hollow frame member 14 and, by means of appropriate pulleys or sheaves, enters into the box frame member 16 wherein its other end is interconnected to a unidirectionally acting hydraulic cylinder. The power cylinder is interconnected in a hydraulic circuit including a pump, the hydraulic system being such that when the pump is energized it pressurizes that side of the cylinder piston which will effect raising of the platform. Conversely, when it is desired to lower the platform from bed height the pump remains deenergized while a valve control is actuated to bleed the cylinder to allow the force of gravity to lower the platform.

Figure 4:
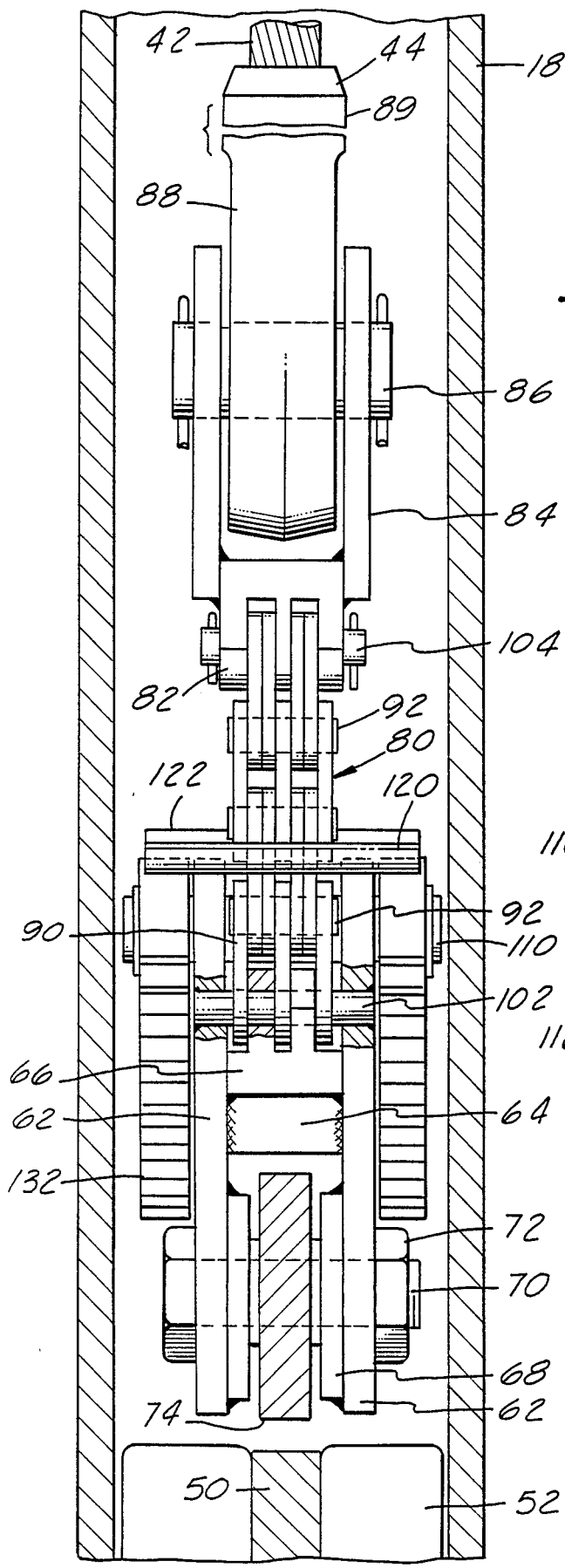
FIG. 4 is a rear side elevational view taken on the line 4—4 of FIG. 2.

The brake assembly 46 comprises a body, designated generally by the numeral 60, comprising a laterally spaced apart pair of identical anchor plates 62. As seen in FIG. 2, the plates 62 are essentially rectangular in plan form and may be held in assembled rigidly spaced apart and congruent alignment by a means of a gusset plate 64 having its opposite vertical edges welded to forward edges of the plates 62. The body 60 is further rigidified by means of a terminal block 66 fitted between the pair of plates 62 and having a pair of opposite ends welded to the plates as shown in FIG. 4. Adjacent their lower ends and on their inside confronting faces, the pair of plates 62 have a pair of coaxially aligned reinforcing washers 68 welded thereto in coaxial alignment with a pair of holes through the plates 62 in order to mount a headed stud 70 that is mounted in the aligned holes of the plates and washers 68. As shown in FIG. 4, opposite ends of the stud 70 extend beyond the outside surfaces of the plates 62 and the stud 70 is threaded at one end to receive a retaining nut 72 as indicated in FIG. 2. The adaptor link 30 is formed with a shank 74 projecting forwardly relative to the runner assembly 22 to pass freely with clearance through the slot 20 of the corresponding guide column. The inner end of the shank 74 is formed with the hole that is journaled on the stud bolt 70 in the space between the confronting pair of reinforcing washers 68.

The terminal block 66 serves to interconnect the body 60 to the lower end of a short length of flexible element or leaf chain 80 that protrudes upwardly beyond the upper end of the body 60. The term "flexible element" means a member such as a length of leaf chain, link chain, wire rope or the like of great tensile strength but which readily flexes in response to a lateral force when tension forces on it are released. The other end of the chain 80 is interconnected to an upper terminal block 82 which, in effect, is the base of a clevis comprising a spaced pair of parallel arms 84 having their lower ends secured, as by welding, to opposite sides of the terminal block 82. The arms 84 are formed with coaxially aligned holes for seating an eye bolt 86 which passes through the eye of an enlarged head 88 of the wire rope end fitting 44 which has an elongated shank 89 within which the wire rope 42 is anchored.

The leaf chain 80 is of a commercially available plate and pin construction. More specifically, the chain comprises a plurality of figure-8 shaped parallel plates 90 and parallel pins 92 interconnected as alternating sets of articulating link plates and pin link plates. Thus, in FIG. 4 the body plates 62, adjacent their upper ends, have the opposite ends of an anchor pin 102 affixed thereto, the pin passing through the aligned openings of a set of three of the plates 90 which comprise a pin link of the leaf chain. The other ends of the set of three plates 90 anchor a connecting pin 92 which also pivotally secure ends of four plates 90 comprising an articulating link. This arrangement of alternating pin links and articulating links is repeated for a desired length of leaf chain 80. The upper end of the chain is secured by a cotter pin secured anchor pin 104 in the upper terminal block 82.

Figure 5:
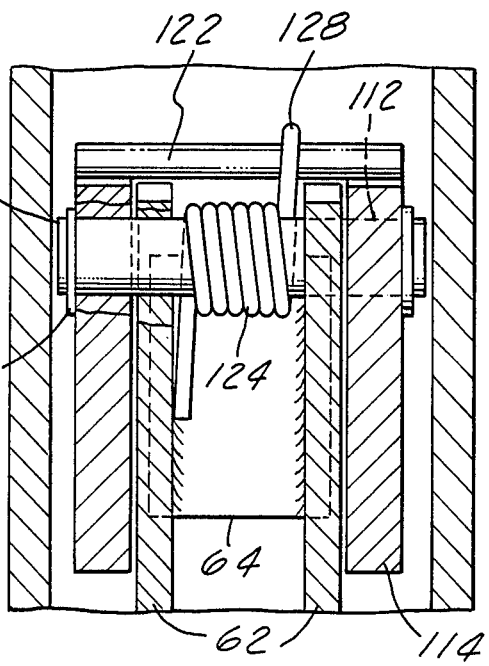
FIG. 5 is a partial sectional view taken on the line 5—5 of FIG. 2.

Referring to FIG. 2, the spaced apart body plates 62 are formed in their upper forward corners with coaxially aligned bores to journal a shaft 110. As is best seen in FIG. 5, the opposite ends of the shaft 110 extend outwardly beyond the pair of plates 62 and pass through bores 112 formed in the root ends of an identical pair of cam pawls 114. Opposite ends of the shaft 110 are fitted with snap rings 116 to retain the pawls 114 against lateral displacement relative to the body 60. As shown in FIG. 3, the pair of pawls 114 are thus disposed on opposite sides of the leaf chain on a pivot axis that is parallel to the pivot axes of the links of leaf chain 80 and each pawl is disposed in alignment with one of a pair of flanges 118 defined in the rear wall of the guide column 18 by the guide slot 20.

The pawls 114 are essentially triangular in configuration and are held together as a unitary assembly by a pair of connecting pins 120 and 122 welded or otherwise secured to the upper edges of the pair of pawls. The connecting pins 120, 122 are disposed on opposite sides of the leaf chain 80. A torsion spring 124 is wound around the pawl support shaft 110 and terminates at one end 126 in a leg that bears against the inside of the gusset 64 of the body 60. The other end of the spring 124 terminates in a leg 128 extending into the space between the leaf chain 80 and the forward connecting pin 122 against which it bears. The pair of cam pawls 114 are thus biased to pivot around the shaft 110 in a clockwise direction as viewed in FIG. 2.

Each of the pawls 114 has a cam edge 130 whose radius relative to the axis of the shaft 110 increases downwardly. While the cam edge 130 could take the form of a friction brake shoe, preferably it is defined by the crests of a space apart series of hardened teeth 132, each of which is formed with asymmetrical flanks adapted for unidirectional biting engagement with the inside surface of one of the flanges 118 of the guide column 18 when the brake is actuated. More particularly, the radius of the cam edge 130 is such that when it occupies a retracted position as shown in FIG. 2, the radius at the upper end of a pawl 114 is sufficiently short that the teeth 132 are spaced away from the corresponding flange 118. The cam radius increases downwardly to a length in excess of that required to jam the side of the body 60 opposite the cam teeth 132, i.e. the gusset plate 64, against the inside surface of the forward wall of the guide column 18 as the pawls 114 rotate clockwise into an extended position in which the teeth 132 bite into the inside surface of one of the flanges 118.

Assuming no break in the wire rope 42, the load suspended dictates the straight and tensioned condition of the leaf chain 80 illustrated in FIG. 2. Since the force of the torsion spring 124 is insufficient to cause deflection of the chain by means of the connecting or contact pin 120, the pair of pawls 114 are thus maintained in the retracted condition of FIG. 2, permitting normal use of the lift gate in raising and lowering loads. However, any significant loss of tension in the wire rope 42 is substantially immediately reflected as buckling of the leaf chain 80 whereupon the torsion spring 124 pivots the pawls 114 into the extended position depicted in FIG. 6. The connecting pin 120 is thus enabled to deflect the leaf chain 80, the hardened cam teeth 132 thus dig into the relatively soft inside surface of the flange 118, and the gusset plate 64 of the body 60 is jammed against the forward wall of the guide tube 18. The mechanism works somewhat like an internal expanding brake that is very sensitive to significant losses of tension in the wire rope 42 to lock the load platform and its load more quickly after failure of the suspension device than has heretofore been possible.

Figure 6:
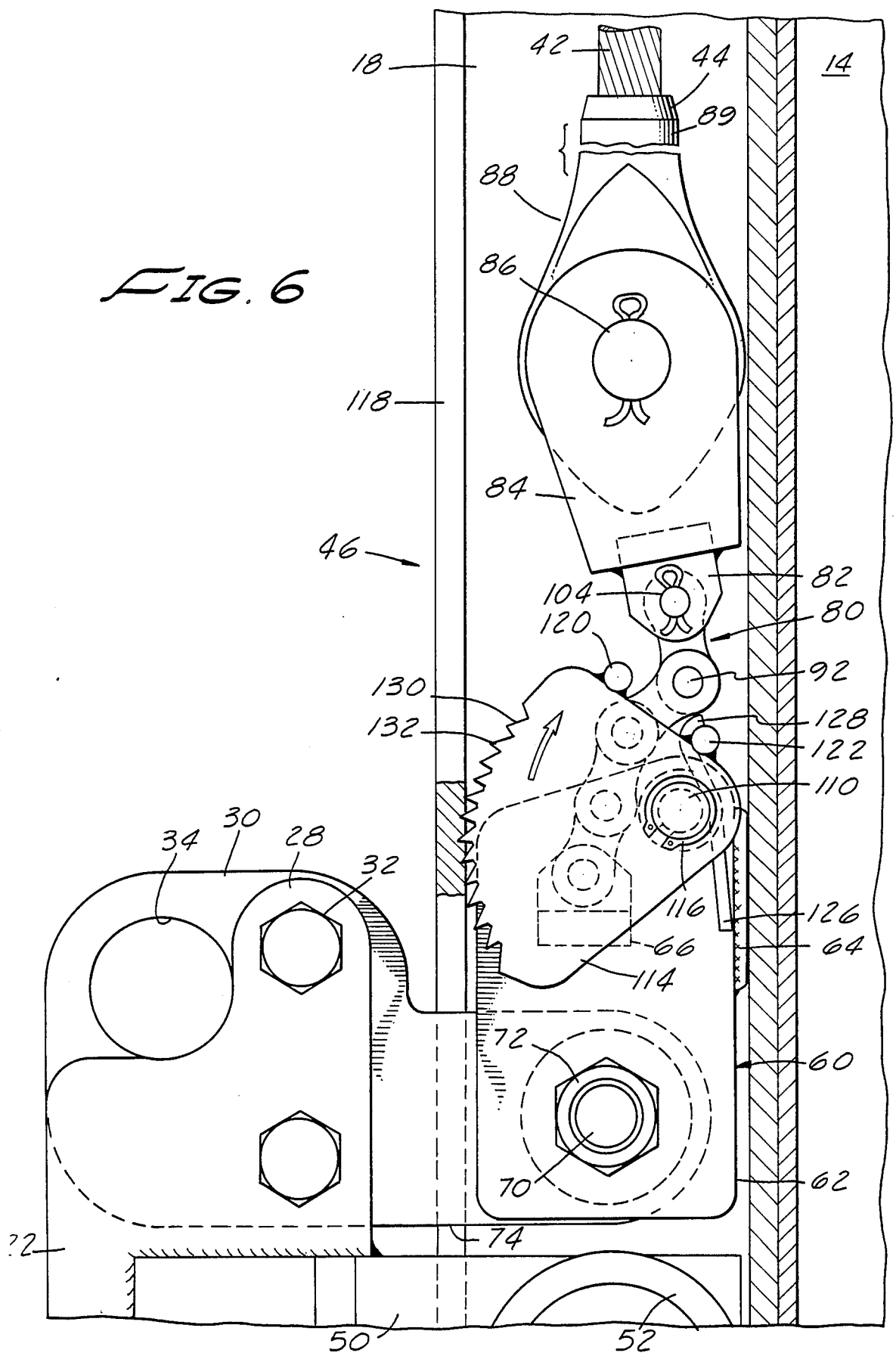
FIG. 6 is a view similar to FIG. 2 but showing the parts in an activated condition of the safety brake.

Assuming the locked condition of FIG. 6, it will be seen that the brake assembly 46 can be unlocked merely by applying an upward force on the clevis mechanism 82, 84, without, at the same time, having to raise a runner assembly 22 or the brake body 60. Such upward force could be applied, for example, by lifting on some portion of the wire rope 42 above the cable end fitting 88. This ability to unlock the brake mechanism 46 is important in a situation where failure of the rope 42 has occurred at or closely adjacent to the upper limit of travel of the runners 22. More specifically, as schematically shown in FIG. 1, in lifts of this kind each of the guide columns 18 is fitted at or adjacent its upper end with an up-stop means 140. This may take the form of an external bracket plate clamped to a member within the guide column 18 which projects downward sufficiently to engage some portion of the runner assembly, for example, the shank 74 of the adaptor link 30, to normally arrest the load platform 24 at the level of the bed height of the vehicle.

Preferably, the hoisting ropes or cables of both guide columns 18 are fitted with a brake assembly 46 in order to divide the load to be arrested in the event of a failure of either or both cables. Also, the brake assembly 46 may be incorporated as part of the original lift equipment or it may be retro-fitted to existing lifts or lift gates.

I claim:
1. A safety brake for mounting within a guide column of a lift, said safety brake comprising:
   a body;
   a means at the lower end of said body for connecting a runner to said body;

a first terminal block affixed to said body at a location spaced below the upper end of said body;

a length of a flexible element having a lower end secured to said first terminal block;

a second terminal block secured to an upper end of said length of flexible element, whereby said second terminal block is displaceable relative to said body in substantially the direction of the axis of said flexible element upon a lateral deflection of said flexible element;

a means on said second terminal block for interconnecting said second terminal block to a powered vertically reciprocable means for suspending said flexible element and said body from said second terminal block, whereby said flexible element is gravitationally biased into a straightened condition by the weight of said body and the weight of a runner and a load to be carried by the runner;

a pawl mounted on said body for movement of said pawl relative to said body between retracted and extended positions of said pawl;

means operatively connected between said body and said pawl for biasing said pawl into movement from said retracted position into said extended position; and contact means carried by said pawl in a position so located that said flexible element, when in tension, normally holds said pawl in said retracted position against the force of said pawl biasing means and whereby said contact means, upon relaxation of tension in said flexible element, is carried by the force of said pawl biasing means in the direction in which said flexible element is laterally deflected as said pawl moves into said extended position;

said pawl and said body expanding into contact with opposite surfaces of the guide column in which said safety brake is mounted upon movement of said pawl into said extended position.

2. A safety brake as in claim 1 wherein:
said flexible element comprises a leaf chain.

3. A safety brake as in claim 2 wherein:
said pawl is pivotally mounted on said body on a pivot axis that is parallel to the pivot axes of the links of said leaf chain.

4. A safety brake as in claim 3 wherein:
said pivot axis of said pawl is located on one side of said flexible element and between opposite ends of said flexible element;
said contact means carried by said pawl being disposed on the opposite side of said flexible element from said pivot axis of said pawl.

5. A safety brake as in claim 1 wherein:
said flexible element protrudes beyond said upper end of said body whereby said second terminal block and said means on said second terminal block for interconnecting said terminal block to a powered vertically reciprocable means are disposed outside of the confines of said body.

6. A safety brake as in claim 5 wherein:
said pawl is pivotally mounted on said body on a pivot axis located on one side of said flexible element and between opposite ends of said flexible element;
said contact means carried by said pawl being disposed on the opposite side of said flexible element from said pivot axis of said pawl.

7. A safety brake for mounting within a guide column of a lift, said safety brake comprising:

a body comprising a parallel pair of plates, said body being adapted for connection to a runner;

a first terminal block having opposite ends rigidly secured to said pair of plates;

a length of a leaf chain having a lower end secured to said first terminal lock, said leaf chain having the pivotal axes of the links of said leaf chain oriented normal to the planes of said plates;

a second terminal block secured to an upper end of said leaf chain, said second terminal block comprising part of a clevis for interconnecting said second terminal block to a powered vertically reciprocable means for suspending said leaf chain and said body from said second terminal block whereby said leaf chain is gravitationally biased into a straightened condition by the weight of said body and the weight of a runner and a load to be carried by the runner;

a pair of cam pawls having root ends pivotally mounted on said body on a pivot axis that is disposed on one side of said leaf chain, said pivot axis of said pair of cam pawls being disposed parallel to the pivot axes of the links of said leaf chain, said pair of pawls each having a cam edge that is swingable between retracted and extended positions relative to said body;

spring means operatively connected between said body and said pair of cam pawls for biasing said pawls into movement from said retracted position into said extended position;

a contact pin mounted on said pair of cam pawls in a position for contacting that side of said leaf chain opposite to said pivot axis of said pair of cam pawls whereby said leaf chain, when in tension, holds said pawls in said retracted position against the force of said spring means and whereby said contact pin, upon relaxation of tension in said leaf chain, is driven by the force of said spring means in a direction to laterally deflect said leaf chain as said pawls move into said extended position, said pawls and said body expanding into contact with opposite surfaces of the guide column in which said safety brake is mounted upon movement of said pawls into said extended position.

8. A safety brake as in claim 7 wherein:
said cam edge of each of said pawls is formed with a series of spaced teeth adapted for unidirectional braking engagement with a surface of the guide column.

9. A safety brake as in claim 7 wherein:
said pair of pawls are disposed in planes parallel to and outside of said pair of parallel plates.

10. A safety brake as in claim 9 wherein:
said pair of pawls have upper edges disposed above upper ends of said pair of plates and
said contact pin is affixed to said upper edges of said pawls on an axis parallel to pivot axes of the links of said leaf chain.

11. A safety brake as in claim 10 wherein:
said spring means comprises a torsion spring, a shaft on said body on which said pawls are pivotally mounted, and a connecting pin fastened at opposite ends to said upper edges of said pawls,
said torsion spring being mounted on said shaft and having one end biased against said connecting pin, said connecting pin and said contact pin being disposed on opposite sides of said leaf chain.

12. A fail safe lift apparatus comprising:

a frame;

an upright hollow guide column secured to said frame;

a runner means operatively connected to said guide column for vertical reciprocation therealong, said runner means having a means for interconnecting a load platform thereto;

a length of a flexible element having a lower end secured to said runner means;

a means for securing the upper end of said flexible element to a means for vertically reciprocating said flexible element and said runner means along said guide column, whereby said flexible element and said runner are suspended from said securing means with said flexible element being gravitationally biased into straightened condition by the weight of said runner means and a load to be carried by the platform, said flexible element comprising the sole means for supporting the weight of said runner means and a load to be carried by the platform; and a means operatively interconnected between said runner means and said flexible element for locking said runner means against descending relative to said guide column in response to a lateral deflection in said flexible element induced by a loss of tension in said flexible element.

13. A fail safe lift apparatus as in claim 12 in which:
said locking means comprises a spring biased pawl that is normally held out of locking engagement with said guide column by contact between said pawl and one side of said flexible element whenever said flexible element is under sufficient tension to be maintained in a straightened condition.

14. A fail safe lift apparatus as in claim 12 in which:
said length of a flexible element comprises a leaf chain.

* * * * *